(12) United States Patent
Sergi

(10) Patent No.: US 6,669,400 B1
(45) Date of Patent: Dec. 30, 2003

(54) TUBE CONNECTING SYSTEM

(76) Inventor: Paul D. Sergi, 2570 Major Rd., Peninsula, OH (US) 44264

( * ) Notice: Subject to any disclaimer, the term of this patent is extended or adjusted under 35 U.S.C. 154(b) by 0 days.

(21) Appl. No.: 10/280,210

(22) Filed: Oct. 25, 2002

(51) Int. Cl.$^7$ ................................................ B60R 9/00

(52) U.S. Cl. ................................... 403/379.3; 403/378

(58) Field of Search .............................. 403/375, 379.3, 403/379.1, 379.2, 109.1–109.4, 378

(56) References Cited

U.S. PATENT DOCUMENTS

| | | | | | |
|---|---|---|---|---|---|
| 3,709,534 A | * | 1/1973 | Coe | ........................ | 403/375 X |
| 6,183,167 B1 | * | 2/2001 | Ruiz et al. | ........... | 403/379.3 X |
| 6,336,580 B1 | * | 1/2002 | Allen et al. | .............. | 403/378 X |

OTHER PUBLICATIONS

A photograph showing four prior art tube connecting systems.

* cited by examiner

Primary Examiner—John R. Cottingham
(74) Attorney, Agent, or Firm—Renner, Kenner, Greive, Bobak, Taylor & Weber

(57) ABSTRACT

In a system for connecting two tubes (11, 12), the end (13) of the first tube (11) is telescopically received in the end (14) of the second tube (12). A hole (15) in the first tube (11) is aligned with a hole (17) in the second tube (12) while at the same time smaller holes (16, 18) in the tubes (11, 12) are aligned with each other. A fastener assembly (20) which includes a fastener having a head (21) and a threaded shaft (22) with an enlarged sleeve (23) positioned therebetween, is passed through the holes (15, 17). The threaded shaft (22) can pass through the smaller holes (16, 18), but the sleeve (23) is larger than the holes (16, 18) and cannot pass therethrough. When a nut (25) is tightened on the threaded shaft (22) a shoulder (24) formed by the sleeve (23) bears against the tube (11) to thereby connect the tubes (11, 12).

9 Claims, 2 Drawing Sheets

TUBE CONNECTING SYSTEM

TECHNICAL FIELD

This invention relates to a system for longitudinally connecting two tubes. More particularly, this invention relates to such a system whereby one tube is telescopically received within another tube and the two tubes are connected by a fastening system without distorting the tubes.

BACKGROUND ART

It is oftentimes desirable to longitudinally, telescopically connect tubing to extend the overall length thereof while reducing the diameter thereof. Such is often done, for example, in the field of antennas where metallic, usually aluminum, tubes form antenna elements of varying lengths. Since these elements often extend for several feet, for wind resistance and other purposes, it is desirable that they are formed of a plurality of telescoping tubes such that the tips thereof are of a lesser diameter than the end where they originate from the antenna boom.

One problem with creating such extended tubing is that the tubes cannot be distorted at the point of their connection, as such would adversely effect the transmission characteristics of the antenna elements. Thus, merely bolting the two tubes together is not acceptable in that in order to obtain the tightness required for a good connection, the tubing would be permanently dimpled or otherwise distorted.

An attempted solution to the problem has been to provide a longitudinal slit in the tube of the larger diameter and then utilize a clamp to tighten the larger tube onto the smaller tube. However, not only is it costly to slit the tubing and provide the clamp, but also the slit itself can be an undesirable distortion, and, more importantly, it creates a stress point for product failure. In addition, since good, solid contact between the tubes is required, with these types of connections it is likely necessary to add a contact-enhancing, oxidation-inhibiting paste such as that sold under the registered trademark PENETROX®. But even then, an antenna element so constructed is subject to twisting at the area of the clamp.

Thus, the need exists for a system to longitudinally connect tubing which creates a strong connection without distortions and without creating undue stress points, all at a reasonable cost.

DISCLOSURE OF THE INVENTION

It is thus an object of the present invention to provide a system for longitudinally connecting the ends of telescoping tubes without distorting the tubes.

It is another object of the present invention to provide a system, as above, which provides a tight connection without the need for the application of contact-enhancing pastes or the like.

It is a further object of the present invention to provide a system, as above, in which there are no stress points created at the connection between the tubes.

It is an additional object of the present invention to provide a system, as above, which is inexpensive.

These and other objects of the present invention, as well as the advantages thereof over existing prior art forms, which will become apparent from the description to follow, are accomplished by the improvements hereinafter described and claimed.

In general, the subject invention includes a system for connecting two tubes with a fastening assembly. Each tube has a first hole aligned with the first hole of the other tube, which holes are opposed to aligned smaller second holes of each tube. The fastening assembly includes a fastening device having a head at one end and a threaded shaft at the other end. An enlarged sleeve is positioned between the head and the threaded end, the sleeve being smaller than the first holes but larger than the second holes. The sleeve can thereby pass through the aligned first holes of the tubes and the threaded shaft can pass through the aligned second holes of the tubes. A nut is received on the threaded shaft such that upon tightening of the nut on the shaft the sleeve engages one of the tubes to force it against the other of the tubes.

In accordance with another aspect of the present invention, a method of telescopically connecting a first tube to a second tube includes the steps of creating a first hole in each tube, and creating a second hole in each tube opposed to the first hole. The first holes are larger than the second holes. The first tube is inserted into the second tube. The first holes of the tubes are then aligned with each other and the second holes of the tubes are likewise aligned with each other. A fastener assembly having a threaded end and an enlarged sleeve is inserted through the first holes, and the threaded end is inserted through the second holes. A nut is tightened on the threaded end so that the sleeve clamps the tubes at the area of the second holes.

A preferred exemplary tube connecting system incorporating the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
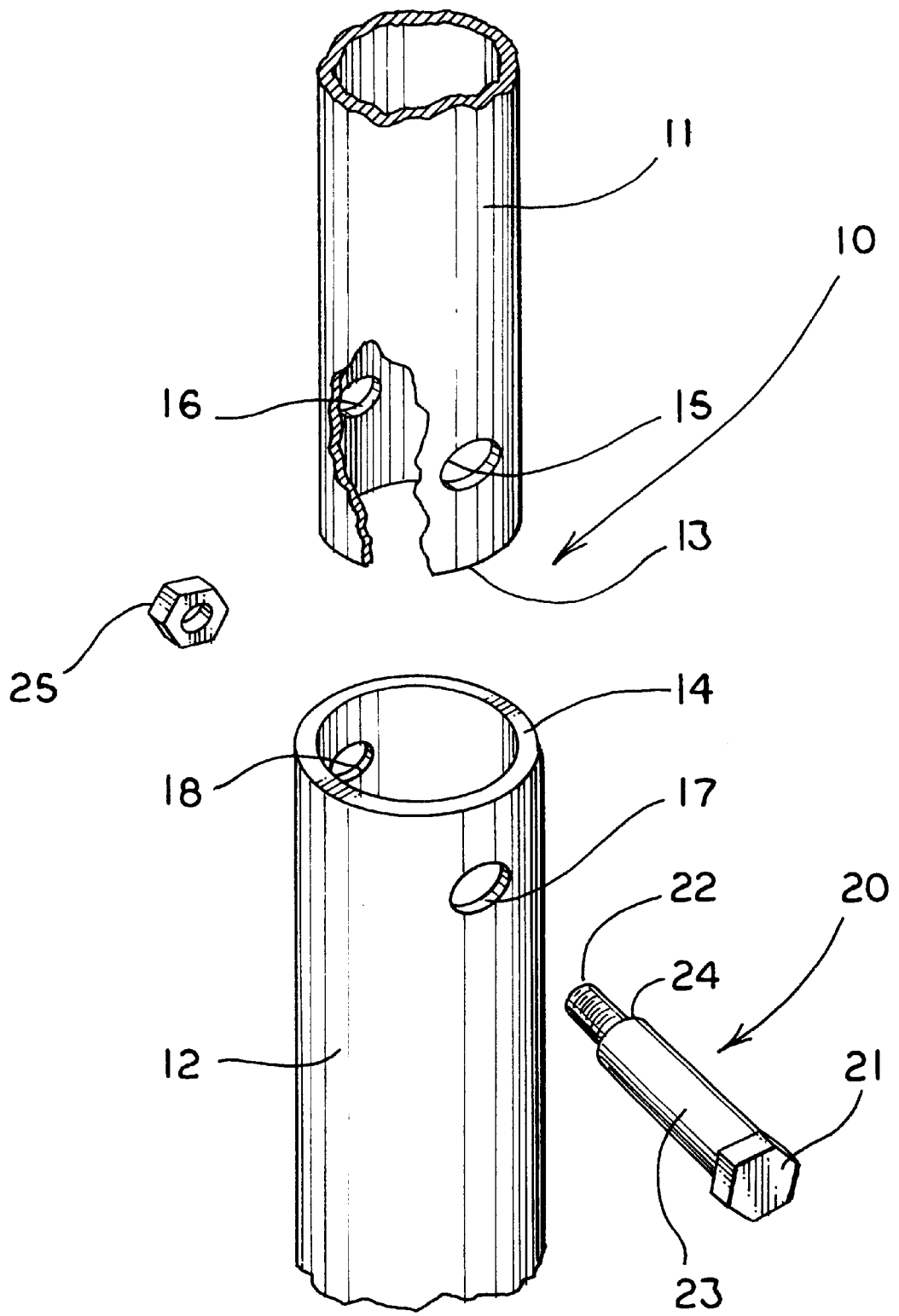
FIG. 1 is an exploded, partially broken away, perspective view of a tube connecting system made in accordance with the present invention.
Figure 2:
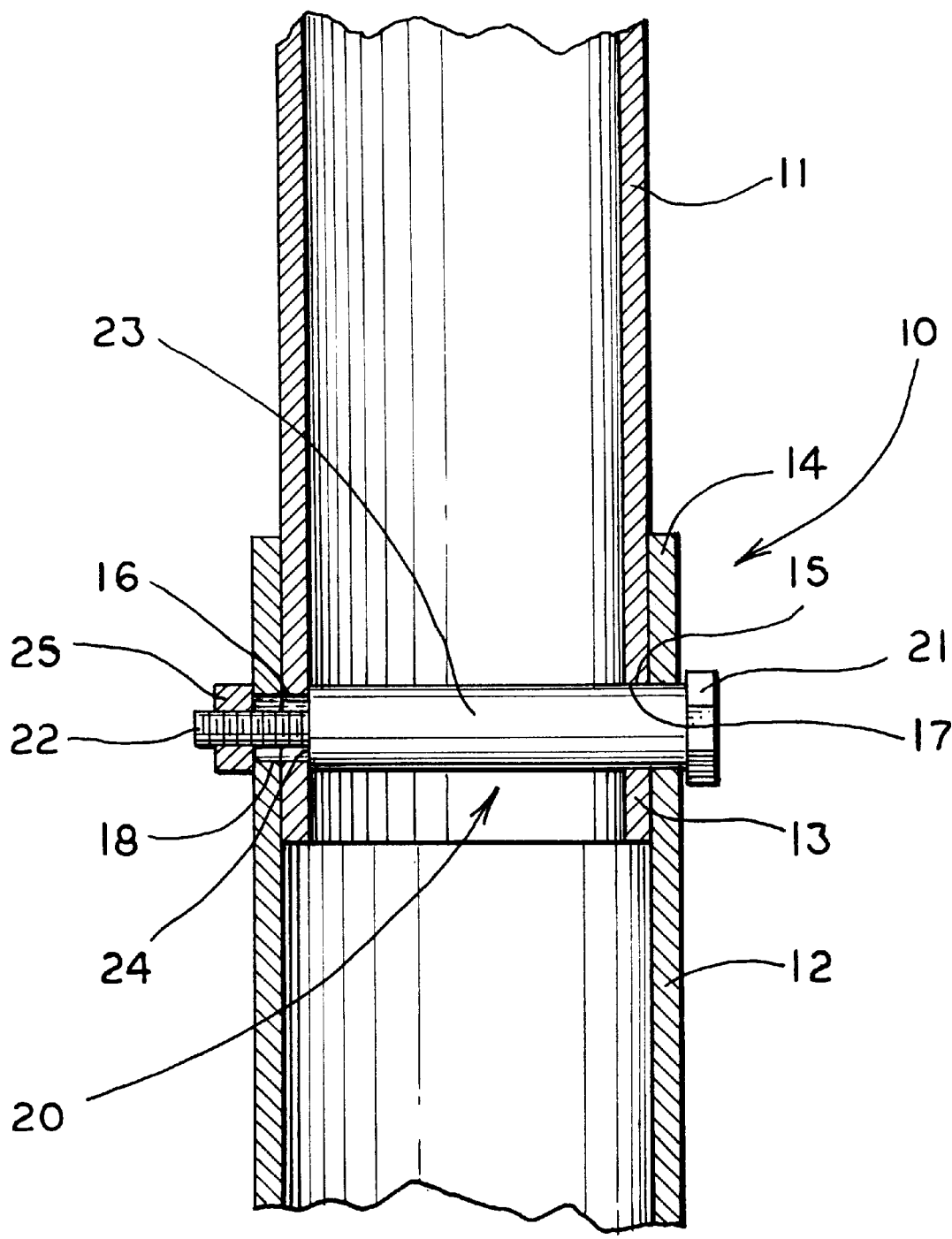
FIG. 2 is a fragmentary, longitudinal sectional view of the system showing the two tubes connected.

A tube connecting system made in accordance with the present invention is generally indicated by the numeral 10. System 10 is utilized to longitudinally attach tubes 11 and 12 which can be made of any material and can be of any configuration. That is, tubes 11 and 12 are shown as being round, but they could be of other configurations, such as square. System 10 has a particular application for use in the antenna field where a plurality of tubes are longitudinally connected together to form elongate antenna elements. In such an instance, the tubes are usually made of aluminum or a like material. As such, for signal transmission purposes, care must be taken so as not to deform the aluminum tubing which is accomplished by the present invention.

Thus, as shown, tube 1 is of a smaller diameter or profile than tube 12 such that the end 13 of tube 11 can be telescopically received in the end 14 of tube 12. Opposed holes 15 and 16 are formed near end 13 of tube 11, and opposed holes 17 and 18 are formed near end 14 of tube 12. In the embodiment shown where tubes 11 and 12 are round, holes 15 and 16 and holes 17 and 18 are diametrically opposed to each other. If tubes 11 and 12 were, for example, square, the holes would be aligned in opposite sides of the square tubes.

With end 13 of tube 11 inserted into end 14 of tube 12, apertures 15, 16, 17 and 18 may be aligned with each other by rotating one tube relative to the other. Then, tubes 11 and 12 may be attached by a fastening assembly generally indicated by the numeral 20. Fastening assembly 20 is preferably a bolt-like member having a head 21 at one end and a threaded shaft 22 at the other end. A sleeve 23 of a larger diameter than shaft 22 is positioned between head 21 and threaded shaft end 22. Sleeve 23 can be a separate tubular member which is received around shaft 22, or it can be integrally formed with shaft 22 and head 21. The end of sleeve 23 opposite to head 21 forms a shoulder 24 which, as will hereinafter be described, provides the bearing surface which applies the force to attach tubes 11 and 12. Fastening assembly 20 also includes a nut 25 which can be threaded onto shaft 23.

It should be noted that holes 15 and 17 of tubes 11 and 12, respectively, are generally of the same size but, importantly, they are larger than holes 16 and 18, and at least slightly larger than the diameter of sleeve 23. Holes 16 and 18 are generally of the same size and are at least slightly larger than the diameter of shaft 22. Importantly, holes 16 and 18 are smaller than the diameter of sleeve 23.

With apertures 15, 16, 17 and 18 aligned, as previously described, shaft 22 and sleeve 23 of fastener assembly 20 are inserted through apertures 15 and 17, and shaft 22 is inserted through apertures 16 and 18. The shoulder 24 of sleeve 23 will thus rest against the inside of tube 11 near the end 13 thereof and around hole 16. As nut 25 is tightened on shaft 22, the ends 13 and 14 of tubes 11 and 12, respectively, are drawn together by the action of shoulder 24 against the tightening of nut 25. As with conventional fasteners, head 21 can also be turned while holding nut 25, and to accommodate such, head 21 is shown as being in hex form for facile engagement by a wrench. However, head 21 could be shaped to accommodate a screwdriver, a ratchet or the like as well.

In view of the foregoing, it should be evident that a tube connecting system constructed as described herein accomplishes the objects of the present invention and otherwise substantially improves the art.

What is claimed is:

1. A system for telescopically connecting two tubes with a fastening assembly, each tube having a first hole opposed to a smaller second hole, said first holes and said second holes being aligned with each other, said fastening assembly including a fastening device, said fastening device including a shaft having a head at one end, said shaft being threaded at least at the other end, and an enlarged sleeve positioned between said head and said threaded other end of said shaft, said sleeve being smaller than said first holes and larger than said second holes such that said sleeve can pass through said first holes and said threaded other end of said shaft can pass through said second holes, and a nut received on said threaded other end of said shaft such that upon tightening of said nut on said threaded other end of said shaft, said sleeve engages one of said tubes to force said one of said tubes against the other said tube.

2. The system of claim 1 wherein said sleeve is integrally formed with said head and said shaft.

3. The system of claim 1 wherein said tubes are circular and an end of said one of said tubes is telescopically received in an end of said other said tube.

4. The system of claim 3 wherein said holes are positioned near said end of each said tube.

5. The system of claim 1 wherein the end of said sleeve opposite to said head forms a shoulder, said shoulder engaging said one of said tubes upon tightening of said nut.

6. The system of claim 1 wherein said head is hexagonal in shape.

7. A method of connecting a first tube to a second tube comprising the steps of creating a first hole in each tube, creating a second hole in each tube opposed to the first holes and smaller than the first holes, inserting an end of the first tube into an end of the second tube, aligning the first holes with each other and the second holes with each other, inserting a fastening assembly having a threaded end, arid an enlarged sleeve through the first holes, the fastening assembly including a head positioned adjacent to the sleeve, whereby the step of the fastening assembly positions the head adjacent to th first holes, inserting the threaded end through the second holes, and tightening a nut on the threaded end so that the sleeve clamps the tubes at the area of the second holes.

8. The method of claim 7 wherein the second holes are created to be smaller than the sleeve.

9. The method of claim 7 wherein the tubes are cylindrical and the step of aligning the holes includes the step of rotating the tubes relative to each other.

\* \* \* \* \*